United States Patent
Kirkpatrick et al.

(10) Patent No.: US 7,079,257 B1
(45) Date of Patent: Jul. 18, 2006

(54) METHODS AND APPARATUS FOR EVALUATING MECHANICAL AND THERMAL STRAINS IN ELECTRONIC MATERIALS, SEMICONDUCTOR MATERIALS, AND OTHER STRUCTURES

(75) Inventors: Sean J. Kirkpatrick, Portland, OR (US); Donald D. Duncan, Silver Spring, MD (US)

(73) Assignee: Providence Health System, Portland, OR (US)

(*) Notice: Subject to any disclaimer, the term of this patent is extended or adjusted under 35 U.S.C. 154(b) by 44 days.

(21) Appl. No.: 10/414,707

(22) Filed: Apr. 15, 2003

Related U.S. Application Data

(63) Continuation-in-part of application No. 10/172,754, filed on Jun. 14, 2002.

(60) Provisional application No. 60/370,927, filed on Apr. 8, 2002.

(51) Int. Cl.
G01B 11/02 (2006.01)

(52) U.S. Cl. ..................................... 356/502

(58) Field of Classification Search ............... 356/502, 356/504, 484, 488, 491, 35.5, 432, 496, 498; 73/1.82, 603
See application file for complete search history.

(56) References Cited

U.S. PATENT DOCUMENTS

| | | | |
|---|---|---|---|
| 3,585,848 A | 6/1971 | Korpel | |
| 3,742,439 A | 6/1973 | Sheridon | |
| 3,790,281 A | 2/1974 | Kessler et al. | |
| 3,983,529 A | 9/1976 | Langlois | |
| 4,012,951 A * | 3/1977 | Kessler | 73/606 |
| 4,526,465 A * | 7/1985 | Corti et al. | 356/35.5 |
| 4,633,715 A | 1/1987 | Monchalin | |
| 4,751,686 A | 6/1988 | Uchino et al. | |
| 5,524,636 A | 6/1996 | Sarvazyan et al. | |
| 5,546,187 A * | 8/1996 | Pepper et al. | 356/487 |
| 5,760,904 A * | 6/1998 | Lorraine et al. | 356/513 |
| 5,806,521 A * | 9/1998 | Morimoto et al. | 600/447 |
| 6,008,887 A | 12/1999 | Klein et al. | |
| 6,043,870 A * | 3/2000 | Chen | 356/35.5 |
| 6,067,859 A | 5/2000 | Käs et al. | |
| 6,087,652 A * | 7/2000 | O'Meara et al. | 250/214.1 |
| 6,097,477 A * | 8/2000 | Sarrafzadeh-Khoee | 356/35.5 |
| 6,160,826 A * | 12/2000 | Swanson et al. | 372/20 |
| 6,400,449 B1 * | 6/2002 | Maris et al. | 356/72 |
| 6,705,993 B1 * | 3/2004 | Ebbini et al. | 600/443 |
| 6,717,681 B1 * | 4/2004 | Bard et al. | 356/520 |

OTHER PUBLICATIONS

Kirkpatrick et al., "High resolution image laser speckle strain guage for vascular applications," *Journal of Biomedical Optics* 5:62-71 (Jan. 2000).

Kirkpatrick et al., "Laser speckle microstrain measurement in vascular tissue," *Proc. SPIE* 3598:121-129 (Apr. 1999).

(Continued)

*Primary Examiner*—Gregory J. Toatley
*Assistant Examiner*—Michael A. Lyons
(74) *Attorney, Agent, or Firm*—Klarquist Sparkman, LLP

(57) ABSTRACT

Methods for measuring strains in circuit substrates such as circuit boards and semiconductor wafers include illuminating a specimen with a substantially collimated laser flux. A temperature change is produced in the specimen and a series of laser speckle patterns produced by a laser flux scattered or reflected by the specimen is recorded. Localized strains are detected based on speckle pattern shifts that are calculated using the recorded speckle patterns. Stains can be recorded as a function of temperature or rate of change of temperature, and strains at one or more circuit substrate locations can be detected.

30 Claims, 4 Drawing Sheets

OTHER PUBLICATIONS

Kirkpatrick et al., "Direct Measurment of Strain Rates in Biological Tissues," *Proc. SPIE* 3914:630-638 (Jun. 2000).

Duncan et al., "Processing techniques for laser speckle derived from biological tissues," *Proc. SPIE* 3914:639-647 (Jun. 2000).

Hinds et al., "Meterial properties of engineered tissues evaluated with nondestructive methods," *Proc. SPIE* 4617:275-283 (2002).

Kirpatrick et al., "Speckle Tracking of Low-Frequency Surface Acoustic Waves for Mechanical Characterization of Tissues," *Proc. SPIE* 4619 (Jan. 2002).

Guck et al., "The Optical Stretcher: A Novel Laser Tool to Micromanipulate Cells," Biophysical Science 81:767-784 (Aug. 2001).

Kirkpatrick et al., *Handbook of Optical Biomedical Diagnostics* Ch. 20 (Feb. 2002).

* cited by examiner

FIG. 3
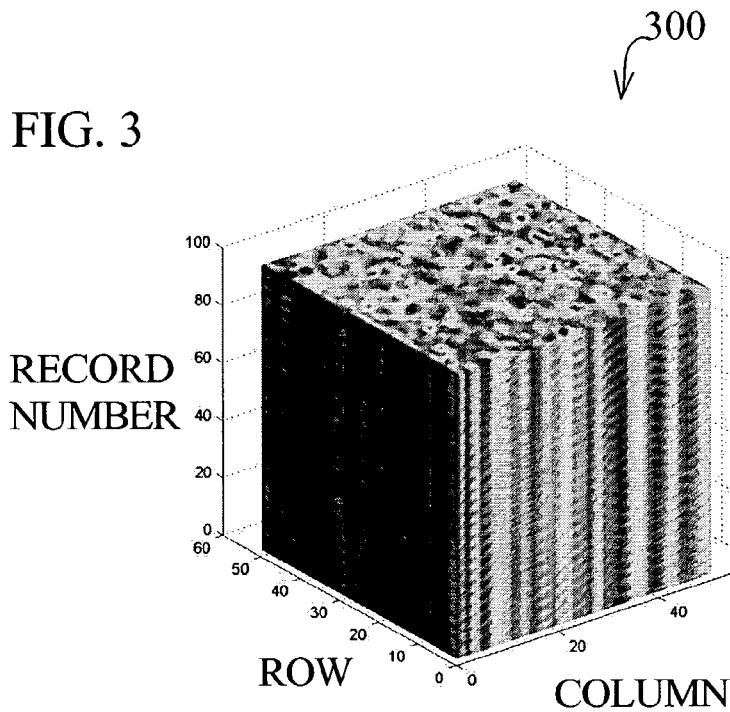
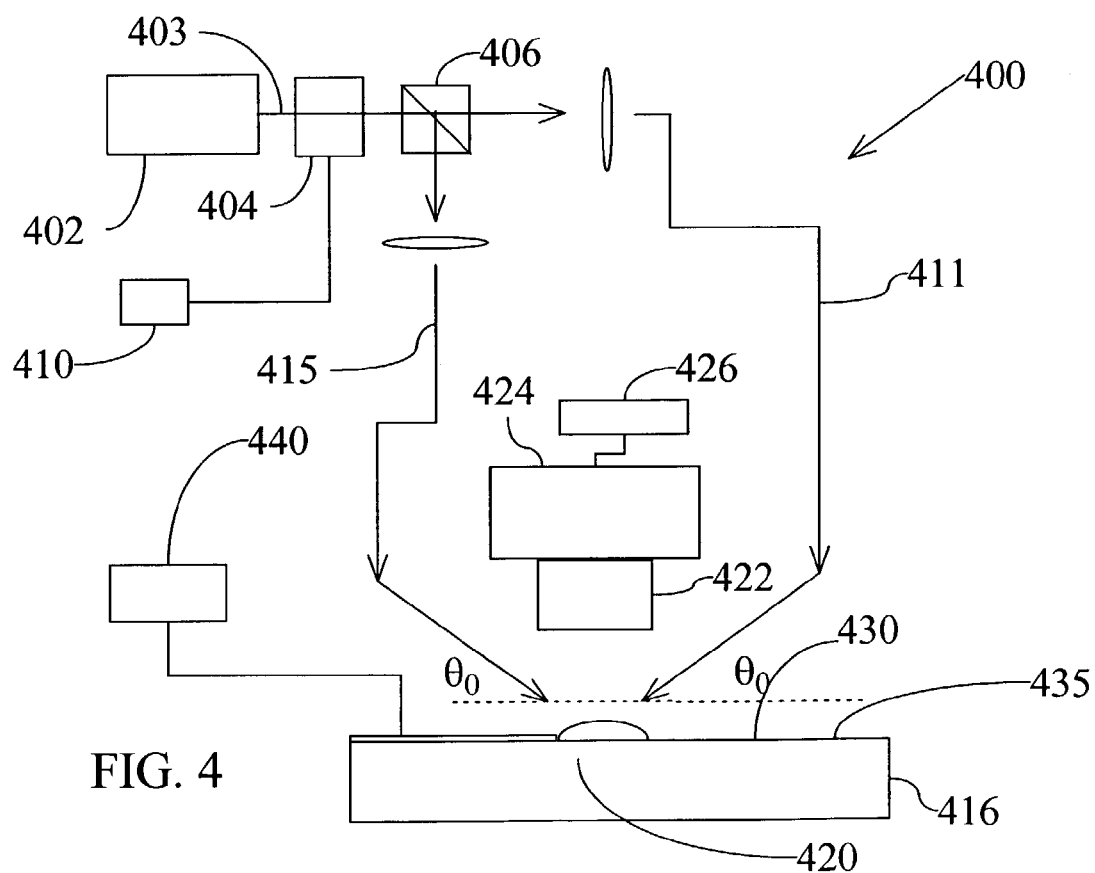
FIG. 4

METHODS AND APPARATUS FOR EVALUATING MECHANICAL AND THERMAL STRAINS IN ELECTRONIC MATERIALS, SEMICONDUCTOR MATERIALS, AND OTHER STRUCTURES

RELATED APPLICATION

This application is a continuation-in-part of application Ser. No. 10/172,754, filed Jun. 14, 2002, which claims the benefit of U.S. Provisional Application No. 60/370,927, filed Apr. 8, 2002, which are incorporated herein by reference.

STATEMENT REGARDING FEDERALLY SPONSORED RESEARCH

The U.S. government has a paid-up license in this invention and the right in limited circumstances to require the patent owner to license to others on reasonable terms as provided for by the terms of Contracts 0201841 and 1096172 awarded by the National Science Foundation.

TECHNICAL FIELD

The invention pertains to materials evaluation using laser speckle.

BACKGROUND

Optical non-destructive evaluation (NDE) has been used in numerous materials characterization applications in the aerospace, semiconductor, and other industries. Conventional optical NDE methods are based on speckle interferometry, speckle photography, or double-exposure holography. Such speckle-based methods take advantage of the speckle patterns produced by the scattering of monochromatic light, such as a laser light flux, from a rough surface and do not require physical contact with a specimen to assess specimen properties.

Speckle-interferometry and double-exposure holographic methods tend to be unsuited to measurement of many specimens of interest. In addition, such conventional methods frequently do not provide sufficient measurement resolution. While some optical NDE methods have been used to evaluate industrial specimens, these methods are generally impractical in typical engineering and manufacturing environments. For example, strain measurements of circuits and circuit components are especially difficult. Accordingly, improved measurement methods and apparatus are needed.

SUMMARY

Apparatus for assessing strain include a light source configured to deliver a light flux to a specimen and a thermal source configured to produce a temperature change in at least a portion of the specimen. An image capture device is configured to receive a series of speckle patterns produced by the light flux in response to the temperature change. A signal processor is configured to receive the series of speckle patterns and determine a speckle shift associated with a specimen strain. In representative examples, a memory is configured to store the series of received speckle patterns. In other examples, a lens is configured so that the speckle pattern received by the image capture device is an imaged speckle pattern. In additional examples, the image capture device is configured to receive two-dimensional speckle patterns. In other examples, the signal processor is configured to determine speckle shifts associated with a plurality of specimen locations and is configured to determine the speckle shift based on a maximum entropy method or a minimum mean square method. The specimen can include a circuit element, and a thermal source can be configured to provide an electrical signal to the circuit element.

In other examples, apparatus include a thermal source configured to produced a temperature change in a specimen. At least one light source is configured to alternately illuminate a specimen at a first angle of incidence and a second angle of incidence, and produce a first series of speckle patterns and a second series of speckle patterns, respectively, wherein the speckle patterns are associated with the temperature change. An image capture device is configured to capture the first and second series of speckle patterns and a signal processor is configured to determine first and second speckle shifts based on the first and second series of recorded speckle patterns. In a representative example, the first angle of incidence and the second angle of incidence are approximately equal and opposite.

Apparatus for assessing a substrate include a light source configured to illuminate the substrate and produce speckle patterns, and an image capture device configured to record the speckle patterns. A thermal driver is configured to produce a temperature change in at least a portion of the substrate. A speckle record processor is configured to detect strain at at least one substrate location based on a shift in the speckle patterns recorded by the image capture device. In additional examples, the thermal driver is configured to produce the temperature change by applying an electrical signal to the substrate and the speckle record processor is configured to estimate speckle shifts associated with at least two regions of the substrate.

Methods of detecting a thermally induced strain in a substrate include generating a temperature change in the specimen and producing a speckle history associated with the temperature change. The thermally induced strain is detected based on the speckle history. In some examples, the temperature change is generated by applying an electrical signal to the substrate.

Methods of assessing a circuit substrate include directing a light flux to a surface of the circuit substrate to produce a speckle pattern and producing a temperature change in the circuit substrate. A shift in the speckle pattern produced in response to the temperature change is measured. A circuit substrate defect is identified based on the measured shift in the speckle pattern. In some examples, the temperature change is produced by applying an electrical signal to the circuit substrate.

These and other features are set forth below with reference to the accompanying drawings.

BRIEF DESCRIPTION OF THE DRAWINGS

FIG. 3 illustrates sequential two-dimensional speckle records displayed as a stacked speckle history.

FIG. 4 is a schematic diagram of a measurement apparatus that alternately directs light fluxes to a specimen at different angles of incidence.

DETAILED DESCRIPTION

A series of speckle patterns produced by irradiating a specimen with a laser or other light source can be recorded. Changes in speckle patterns can be used to detect or quantify specimen deformation or specimen strain. Strain measurement and detection methods and apparatus are described in some examples below with reference to specimen strain, specimen motion, or specimen distortion associated with specimen temperature changes or temperature gradients, but in other examples, strains can be generated mechanically, acoustically, or otherwise generated.

Figure 1A:
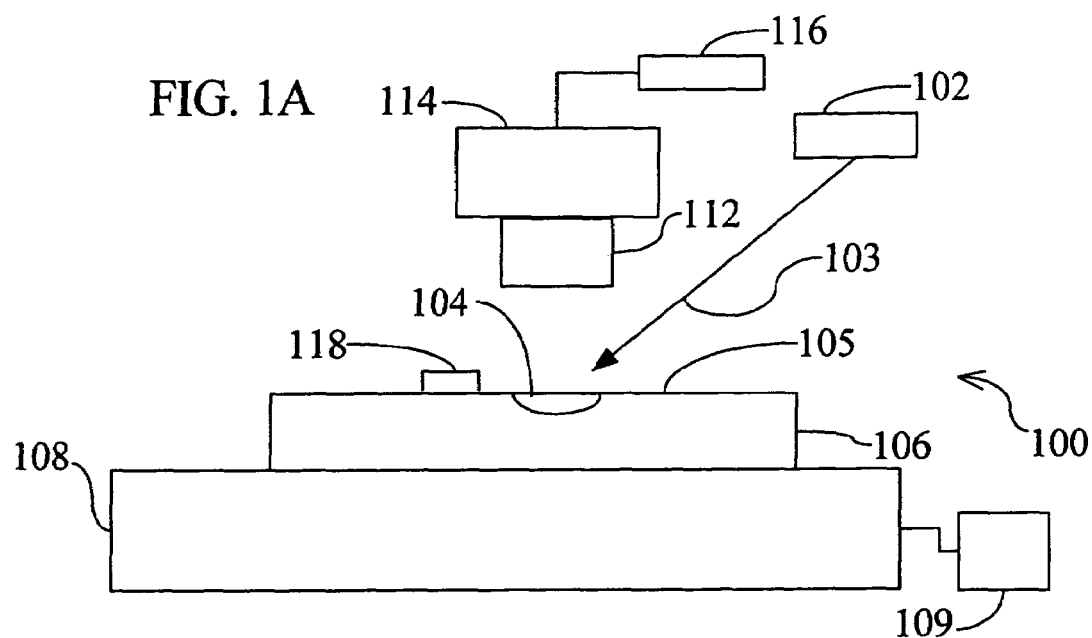
FIG. 1A is a schematic diagram of a speckle-based measurement system that produces stacked speckle histories.

With reference to FIG. 1A, an optical test system 100 that permits specimen strain evaluation includes a laser 102 that delivers a light flux 103 to a region of interest (ROI) 104 of a specimen 106. The light flux 103 can be conveniently delivered to the specimen 106 with an optical fiber, fiber bundle, or other optical waveguide(s) that is configured to receive the light flux 103 from the laser 102 and direct the light flux 103 to the specimen 106. Typically the light flux 103 is substantially collimated as delivered to the specimen 106, but lenses or other optical elements associated with collimation or other beam shaping procedures are not shown in FIG. 1A. While beam collimation is convenient, uncollimated light fluxes can also be used.

As shown in FIG. 1A, the specimen 106 is situated on a thermal plate 108 that is in communication with a temperature controller 109 that is configured to heat or cool the thermal plate 108. A temperature sensor 118 such as, for example, a thermocouple or thermometer can be configured to be in communication with the temperature controller 109 for use in measurement and control of specimen temperature. In other examples, specimen temperature is established by situating the specimen 106 in a temperature-controlled environment such as that provided by a process chamber or oven. Such processing chambers can be configured to raise or lower specimen temperature, typically using a resistive heater to increase chamber temperature and liquid nitrogen or other cooling or refrigeration mechanism to decrease chamber temperature. In other examples, temperature changes can be conveniently produced using a coolant spray or using a soldering iron. In some examples, temperature changes can be regulated so that one or more selected specimen temperatures are achieved, or a selected rate of temperature change is produced. In other examples, a specimen can be situated to achieve a selected spatial temperature gradient. In a representative example, the thermally controlled plate 108 is configured to elevate specimen temperature. In other examples, temperature control is omitted, and specimen strains are detected as or after a specimen is cooled or heated, without quantifying an associated temperature change or rate of change. Inspection of a stacked speckle history or strain value obtained based on a stacked speckle history can permit specimen assessment without measurement of temperature.

A telecentric lens 112 or other lens or lens system is situated to receive portions of the light flux reflected or scattered at the region of interest 104 and deliver the received portions to an optical sensor array 114. The sensor array 114 can be a one dimensional array suitable for producing line images or a two dimensional array that can produce two dimensional images. The sensor array 114 provides electrical signals associated with one or two dimensional speckle pattern records (images) to a signal processor 116. The signal processor 116 is configured to produce strain values or other measured values based on the speckle pattern records.

Figure 1B:
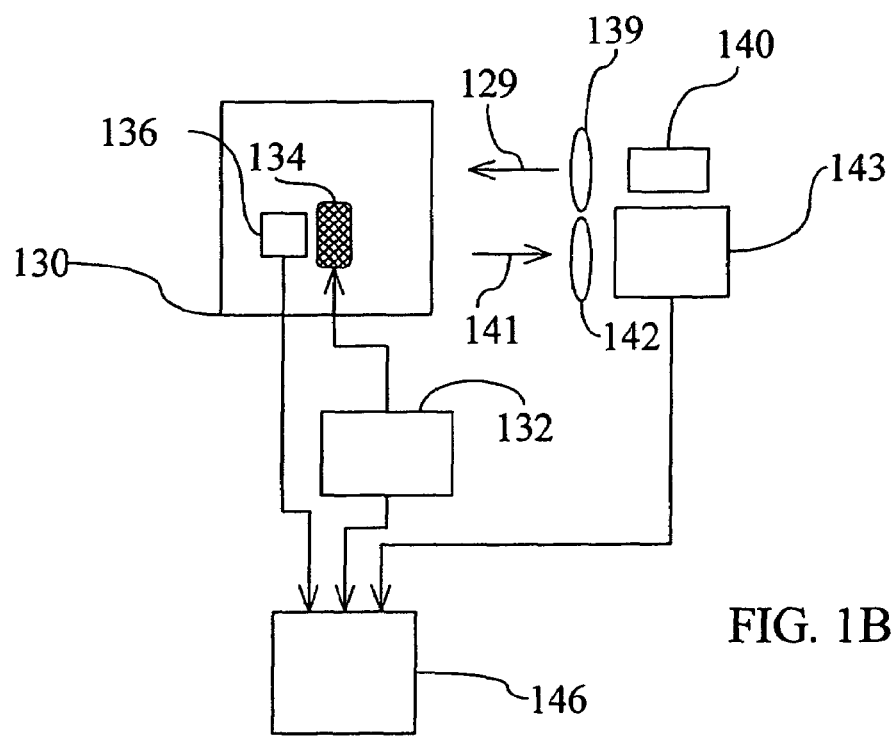
FIG. 1B is a schematic diagram illustrating a speckle-based measurement system configured to produce stacked speckle histories associated with a circuit element.

With reference to FIG. 1B, an electrical assembly 130 such as a circuit board, an integrated circuit, a discrete circuit component, or a processed semiconductor wafer is configured so that an electrical drive circuit 132 is electrically connected a circuit element 134. A temperature sensor 136 can be situated so as to be responsive to circuit element temperature or temperature changes or to temperatures or temperature changes at other portions of the circuit assembly 130. A laser 140 or other suitable light source is configured to direct a laser beam 129 to the circuit assembly 130 using a lens 139 or other optical system. The lens 139 can be configured so that only the circuit element 134 or portions thereof are irradiated, or a larger portion of the electrical assembly 130 can be irradiated. Radiation 141 reflected or scattered at the electrical assembly 130 is returned to an optical system 142 and direct to an image sensor 143. Speckle patterns detected by the image sensor 143 can be stored in a memory associated with the image sensor 143 or delivered to a memory associated with a speckle processor implemented as a dedicated processor or, as shown, as a series of computer executable instructions for execution on a personal computer 146 or other computing system such as a network computer or workstation. Computer executable instructions can be stored on a floppy disk, a hard disk, a CD-ROM, in random access memory (RAM), or in other storage media. A computing system 146 such as a personal computer 146 can also be configured to be in communication with the electrical driver 132 and the image sensor 143 for data reception or device control. The computing system 146 generally includes a display such as a liquid crystal display or a cathode ray tube display, and strains or other electrical assembly conditions and/or an electrical assembly image can be displayed at the computer 146. For small measurement areas, a microscope can be used so that small areas of the electrical assembly can be irradiated and/or speckle patterns from small areas can be accumulated. In addition, in some examples temperature control and/or temperature measurement are omitted, and temperature is increased or decreased without such control and measurement. Speckle patterns received at the computer 146 can be accumulated to form a stacked speckle history, and strains assessed based on the stacked specimen history. A dedicated processor for processing stacked speckle histories can be provided instead of or in addition to a general purpose computer. In some examples, a portable digital assistant (PDA) or handheld computer is provided.

Figure 2:
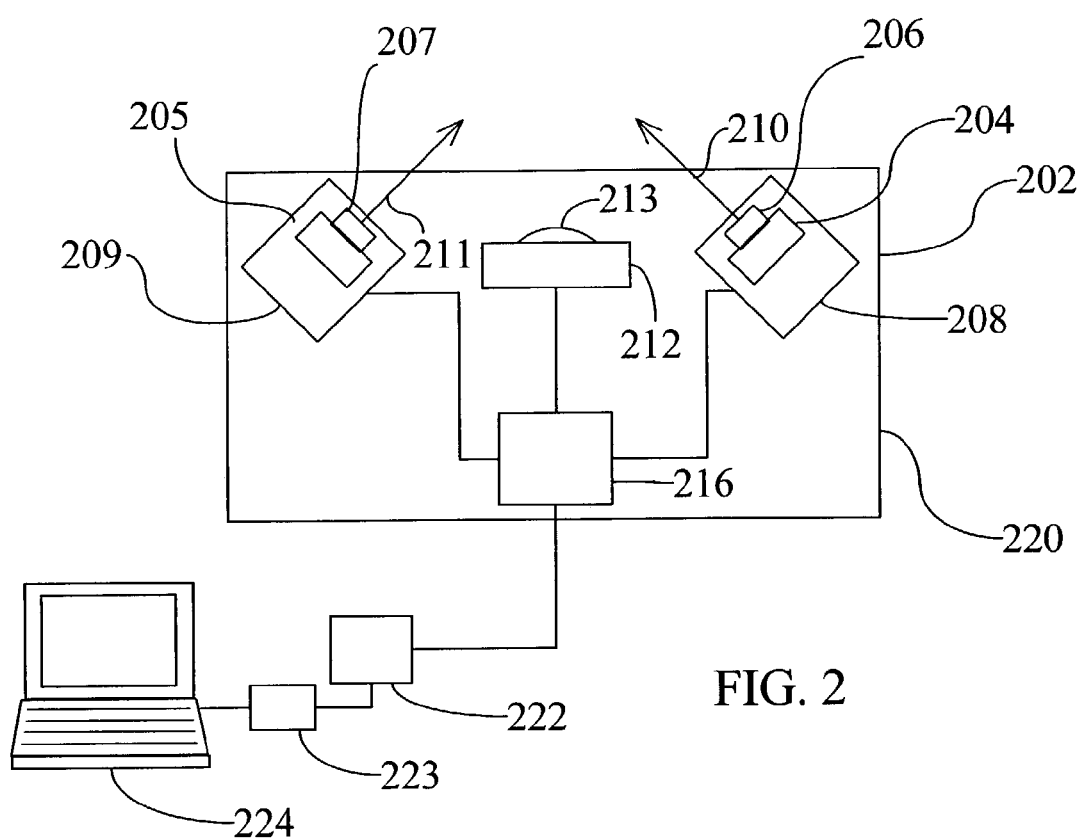
FIG. 2 is a schematic diagram of a speckle-based measurement system that includes two laser diodes.

With referenced to FIG. 2, a speckle-based analysis system 200 includes a first laser diode 204 and a second laser diode 205 that are provided with a first beam-forming lens 206 and a second beam-forming lens 207 that produce optical beams directed along a first axis 210 and a second axis 211, respectively. For convenience, the laser diodes 204, 205 are situated on respective laser diode controller boards 208, 209 that can be provided with circuit components used to activate and control the laser diodes 204, 205, respectively. A CCD camera 212 is situated to receive radiation from a sample under test, and a lens 213 is provided to direct a speckle pattern or other image to the CCD camera 212. In some examples, the lens 213 can be omitted. The laser diodes 204, 205 can emit visible radiation at, for example, a wavelength of about 670 nm, but other longer or shorter wavelengths ca be used. Cameras other than CCD cameras can also be used and can be selected based on the emission wavelength of the laser diodes 204, 205. Alternatively, a one-dimensional diode array can be used. A connector assembly 216 can be situated on an optical breadboard or other support structure, and the laser diodes 204, 205 and the CCD camera 212 and associated electronics and optics can be fixed to the optical breadboard 220.

As shown in FIG. 2, the apparatus 200 is electrically connected to a laptop computer 224 with a terminal board, but in other examples, can be directly connected to a laptop computer, a handheld computer, a network computer, workstation, or a dedicated computer. The computer includes a hard disk and memory, and includes computer executable instructions for control of the apparatus 200 and evaluation and analysis of image signals and data obtained with the CCD camera 212. The computer instructions can be based on a LABVIEW graphical development environment, and a computer-based data acquisition and control board (DAC board) 223 can be included with the laptop computer 224. For convenience, the DAC board 223 can be internal to the laptop computer 224. The DAC board 223 can be configured to supply electrical power to the apparatus 200, but in other examples, the laptop computer 224 provides power directly or a dedicated power supply can be provided. Computer executable instructions can also be provided in a C++ programming language or other programming language.

In a representative operational method, the laser diodes 204, 205 are controlled so as to alternately irradiate a specimen and the CCD camera 212 alternately acquires speckle records associated with illumination angles provided by the lasers 204, 205. As shown below, such irradiation at two angles can be configured to reduce contributions of bulk specimen motion, and equal and opposite angles can eliminate or substantially reduce such effects.

Specimen strains or other specimen properties can be detected or quantified based on stacked speckle histories as described below.

Speckle Properties

Speckle-based measurements can use first order speckle statistics, second order speckle statistics, or other speckle properties. First order statistics relate to speckle pattern properties at a single point, while second order statistics relate to joint statistical properties of a speckle pattern at two or more points, and can be associated with speckle granularity and speckle size. Mean speckle size in a speckle field depends upon viewing system aperture. For so-called objective (non-imaged) speckle, an effective aperture is a diameter D of a uniformly illuminated area on a scattering surface. Mean speckle diameter $d_{sp}$ at a screen a distance z from a scattering plane is approximately $$d_{sp} \approx 1.2 \lambda_o z/D$$

wherein $\lambda_o$ is an illumination wavelength. If a lens is used to image a speckle pattern (imaged or so-called subjective speckle), then mean speckle size $d_{sp}$ is approximately $$d_{sp} \approx 2.4 \lambda_o f/2R_a,$$

where f is a lens focal length and $2R_a$ is a diameter of the viewing lens aperture. If a magnification M is provided, then $$d_{sp} \approx 1.2(1+M)\lambda_o f/2R_a.$$

The above approximations are based on an assumption that the lens images the scattering surface, but such imaging is not required.

In some representative examples described herein, measurement systems are configured to assess specific specimen responses to a thermal or other stimulus. Yamaguchi, "Simplified laser speckle strain gauge," Opt. Eng 21:436–440 (1982), discloses that for an object undergoing strain, speckle shift observed at an angle $\theta_o$ for an illumination angle $\theta_s$ is given by:

$$\delta x(\theta_o, \theta_s) = a_x \left[ \frac{L_o \cos^2 \theta_s}{L_s \cos \theta_o} + \cos \theta_o \right] - a_z \left[ \frac{L_o \cos \theta_s \sin \theta_s}{L_s \cos \theta_o} + \sin \theta_o \right] - \quad (22)$$

$$L_o \left[ \varepsilon_{xx} \left( \frac{\sin \theta_s}{\cos \theta_o} + \tan \theta_o \right) - \Omega_y \left( \frac{\cos \theta_s}{\cos \theta_o} + 1 \right) \right],$$

wherein $a_x$ is an in-plane motion, $a_z$ is an out-of-plane motion, $\varepsilon_{xx}$ is a linear strain in a plane of the detector and laser beams (a parameter of interest herein), $\Omega_y$ is a rotation about an axis perpendicular to the measurement plane, $L_s$ is a radius of an illuminating wavefront (i.e., source distance), and $L_o$ is an observation distance. Using a configuration such as that of FIG. 1 with $\theta_o = 0°$ and a collimated light flux ($L_s \to \infty$), and subtracting speckle motions observed at two equal, but opposite illumination angles, a differential speckle shift $\delta A$ is:

$$\delta A \equiv \delta x(0, +\theta_s) - \delta x(0, -\theta_s) = -2L_o \varepsilon_{xx} \sin \theta_s.$$

Thus, the in-plane strain term can be isolated. Using a complementary configuration with two cameras and a single illumination angle, $$\delta A \equiv \delta x(+\theta_o, 0) - \delta x(-\theta_o, 0) = -2L_o \varepsilon_{xx} \tan \theta_o - 2a_z \sin \theta_o,$$

and the desired strain term can be isolated if a term containing $a_z$ is negligible with an appropriate choice of $L_o$ and $\theta_o$.

Referring again to FIG. 1, in operation, a temperature change is produced in the specimen 106. A surface 105 deforms so that a speckle pattern received by the optical sensor 112 varies. Speckle records are captured sequentially. For a two dimensional image sensor, speckle amplitudes $g_{ij}$ received at a pixel in an $i^{th}$ row and a $j^{th}$ column are recorded, and the recording process continues until a total $N_{rec}$ of speckle records are captured. A representative two dimensional stacked speckle history 300 is illustrated in FIG. 3. In FIG. 3, speckle amplitudes received by sensor pixels of the image sensor 112 are shown as a function of pixel row and column for a series of sequential speckle records. Speckle amplitudes are represented as gray levels but can be displayed using color grading as well.

In a typical example, the apparatus of FIG. 1 includes a helium-neon laser that produces a 633 nm light flux that is supplied to the ROI 104 at an angle of incidence of about 45 degrees. Speckle records can be captured using 512 pixels of a linear CCD array camera. A total of 200 speckle records (or more or fewer) can be captured with a sample period of 20 ms and an integration time of 10 ms. As shown in FIG. 2, pixel amplitudes can be shown as gray levels that are functions of row and column location and record number. Speckle shifts can be obtained from the stacked speckle history 200 (or a one-dimensional stacked speckle history) using a maximum likelihood method or other methods described below.

Two-dimensional maps of specimens can be obtained using an optical measurement apparatus 400 illustrated in FIG. 4. The apparatus 400 includes a laser 402 that delivers a light flux 403 to an electrically switchable half-wave retarder 404 and to a polarizing beamsplitter (PBS) 406. The switchable half-wave retarder 404 can be an electro-optical crystal or the like that is configured to rotate a polarization of the light flux 403 by 90 degrees or to leave the polarization unchanged based on a voltage applied by a controller 410. The PBS 406 typically transmits a parallel (p-polarized) light flux 411 to a beam delivery system such as an optical fiber and associated collimating and focusing lenses. The PBS 406 also typically reflects a perpendicular (s-polarized) light flux 415 to a beam delivery system such as an optical fiber and associated collimating and focusing lenses. Depending on a voltage applied by the controller 410 to the switchable retarder 406, the light flux 403 is delivered to a specimen 416 at an incidence angle of $-\theta_0$, or $\theta_0$, respectively. Other incidence angles can be used, but angles of approximately the same magnitude offer certain advantages as explained above. Other types of switching can be used, and different polarization states can be selected. The light fluxes are generally delivered as collimated light fluxes, but lenses or other components used in collimation are not shown in FIG. 4.

The light fluxes 411, 415 are thus delivered to a region of interest 420. A lens 422 and a camera 424 receive portions of the light fluxes 411, 415 reflected or scattered by the specimen 516 and deliver electrical signals associated with speckle records to a signal processor 426. A temperature control element 430 is situated on or near a surface 435 of the specimen 416, and sufficiently close or in contact with the specimen 416 so that temperature changes can be produced in at least the region of interest 420. In some examples, a function generator 440 or other electrical signal generator is connected to one or more circuit elements associated with the specimen, and the electrical signals provided to the circuit elements tend to heat the specimen. Such specimen heating can be configured to produce temperature changes associated with an intended operational temperature range for a circuit, or to produce larger temperature changes.

The apparatus 400 of FIG. 4 is similar to the system 100 of FIG. 1, but permits sequential illumination from two opposite, but substantially equal angles. The camera 424 is synchronized with beam switching to generate two stacked speckle histories, one for each of the two incidence angles. Beam delivery with optical fibers permits measurement of specimens with difficult access. The imaging system can also be fiber coupled using, for example, a coherent fiber bundle. An illuminated specimen area can be selected by shaping the beam. From the stacked speckle histories, a pixel-by-pixel analysis can be performed to calculate in-plane strains in a direction of loading. An image can then be constructed based on the magnitude of the strain field and quantitatively display the effects of holes, cracks, inclusions, and other specimen features. This image is two-dimensional strain map. Such a laser speckle-based strain mapping apparatus can produce a strain resolution of better than about 1 part per million, is insensitive to vibration and other zero-mean noise sources, and can be used on a variety of samples.

Speckle Shift Determination

Speckle shifts can be estimated using several methods. For convenience, these methods can be classified as non-parametric methods or parametric methods. Non-parametric methods generally are not based on assumptions about measured speckle shifts. Representative examples of non-parametric methods can be based on cross-correlations of sequential speckle records, in which shifts of correlation peaks between the speckle records are associated with speckle pattern shifts. To improve computational efficiency, cross-correlations are typically calculated using Fourier transforms. Parametric methods include minimum mean square error methods, maximum likelihood methods, and maximum entropy methods. These parametric methods are described below. For convenience in describing these methods, it is assumed that over a time period in which at least a few sequential speckle records are obtained, the structure of the speckle pattern is fixed and the only change with time is a lateral translation of the speckle pattern. In addition, the methods are described below with reference to one dimensional speckle records or two dimensional speckle records.

Minimum Mean Square Error Methods

Speckle motion can be modeled as:

$$g_{j+1}(x_i) = g_j(x_i - \delta x), \quad (1)$$

wherein g is a speckle record pixel value, $\delta x$ is speckle shift, i denotes an $i^{th}$ pixel in a speckle record, and j represents a speckle record number. For two dimensional speckle records, an additional index can be used. If the speckle shift $\delta x$ is small compared to pixel size, Eq. (1) can be approximated as $$g_{j+1}(x_i) \approx g_j(x_i) + \delta x g'_j(x_i), \quad (2)$$

corresponding to two terms of a Taylor series expansion for g. For computational convenience, speckle records on either side of a record of interest are selected for evaluation so that terms $$[g_{j+1}(x_i), g_{j-1}(x_i)], \quad (3)$$

are selected. The speckle shift $\delta x$ is calculated to minimize a mean square error $$\varepsilon_j^2 = \sum_{i=1}^{N} [g_{j+1}(x_i + \delta x) - g_{j-1}(x_i - \delta x)]^2, \quad (4)$$

wherein the summation is performed over all pixels in the speckle records. Eq. (4) can be solved using a gradient search algorithm. Alternatively, using the small speckle motion approximation of Eq. (2), differentiation with respect to $\delta x$ and rearrangement produces the following relationship:

$$\delta x_j = \frac{-\sum_{i=1}^{N} [g_{j+1}(x_i) - g_{j-1}(x_i)][g'_{j+1}(x_i) + g'_{j-1}(x_i)]}{\sum_{i=1}^{N} [g'_{j+1}(x_i) + g'_{j-1}(x_i)]^2}. \quad (5)$$

The term in the first square bracket in the numerator is a first central difference approximation to a derivative, $$\frac{\partial g_j(x_i)}{\partial t_j} \approx \frac{g_{j+1}(x_i) - g_{j-1}(x_i)}{2} \quad (6)$$

Spatial derivatives may be approximated as $$\frac{\partial g_{j+1}}{\partial x_i} \approx \frac{g_{j+1}(x_{i+1}) - g_{j+1}(x_{i-1})}{2}; \text{ and} \quad (7)$$

$$\frac{\partial g_{j-1}}{\partial x_i} \approx \frac{g_{j-1}(x_{i+1}) - g_{j-1}(x_{i-1})}{2}.$$

The speckle shift δx is a rate at which a speckle pattern shifts in units of pixels/record.

Although the above example method is based on speckle records on either side of a selected record, additional records can be included and their contributions weighted appropriately to estimate higher order approximations. For example, instead of using the weights $$\frac{1}{2}[-1, 0, +1], \quad (8)$$

that correspond to records on either side of a selected record, the weights $$\frac{1}{12}[1, -8, 0, 8, -1] \quad (9)$$

can be used so that two records on either side of the selected record are used. With such weights, the mean square error is:

$$\varepsilon_j^2 = \sum_{i=1}^{N} \quad (10)$$

$$[g_{j+2}(x_i + 2\delta x) - 8g_{j+1}(x_i - \delta x) + 8g_{j-1}(x_i - \delta x) - g_{j-2}(x_i - 2\delta x)]^2,$$

the temporal derivative term of Eq. (5) is $$[-g_{j-2}(x_i) + 8g_{j-1}(x_i) - 8g_{j+1}(x_i) + g_{j+2}(x_i)] \approx 12 \frac{\partial g_j(x_i)}{\partial t_j}, \quad (11)$$

and the term involving spatial derivatives is $$[-2g'_{j-2}(x_i) + 8g'_{j-1}(x_i) + 8g'_{j+1}(x_i) - 2g'_{j+2}(x_i)]. \quad (12)$$

Note that this is simply a weighted average, $$12 \left\{ \frac{4}{3} \left[ \frac{g'_{j-1} + g'_{j+1}}{2} \right] - \frac{1}{3} \left[ \frac{g'_{j-2} + g'_{j+2}}{2} \right] \right\} \quad (13)$$

of terms on either side of the selected record. These higher order operators for the derivative can be used to estimate the spatial derivatives:

$$\frac{\partial g_j(x_i)}{\partial x_i} \approx \frac{1}{12}[-g_j(x_{i-2}) + 8g_j(x_{i-1}) - 8g_j(x_{i+1}) + g_j(x_{i+2})]. \quad (14)$$

The higher order approximations to the derivative typically exhibit superior noise rejection but at the expense of reduced temporal resolution.

The only a priori assumption used in the above methods is that the speckle shift is small with respect to the pixel size. If it is further assumed that measured speckle records include a deterministic speckle signal component and a noise component, the measured signal can be modeled as $$d_j(x_i) = g_j(x_i) + n_j(x_i), \quad (15)$$

wherein n is a zero-mean noise signal. If the central difference about the $j^{th}$ record is calculated, $$d_{j+1}(x_i + \delta x) - d_{j-1}(x_i - \delta x) = g_{j+1}(x_i + \delta x) - g_{j-1}(x_i - \delta x) + n_{j+1}(x_i + \delta x) - n_{j-1}(x_i - \delta x). \quad (16)$$

Sequential speckle patterns are assumed to have a constant mean and the noise is a assumed to be a statistically independent Gaussian random variable with zero mean and constant variance. As a result the noise probability density function can be written as $$p(d_j | g_j) = p(n_j) = C \exp\left\{ \frac{-1}{2\sigma^2} \sum_{i=1}^{N} [g_{j+1}(x_i + \delta x) - g_{j-1}(x_i - \delta x)]^2 \right\}, \quad (17)$$

wherein C is a constant. Equation (17) is referred to as a likelihood function. To choose the δx that maximizes this likelihood, the following equation is solved:

$$\frac{\partial}{\partial(\delta x)} \ln p(d_j | g_j) = 0. \quad (18)$$

Carrying out this calculation leads to the formula in Eq. (5). It can be shown that this provides an unbiased estimate of the speckle pattern shift and that the variance of the estimate attains the Cramér-Rao lower bound.

Entropy Based Methods

Additional methods are based on maximum entropy estimators. Speckle motion is modeled as $$g_{j+1}(x_i) = g_j(x_i - \delta x), \quad (19)$$

wherein the index j denotes a speckle record number and the index i denotes a selected pixel in the speckle record. According to Eq. (19), the difference between speckle records j and j+1 is that the latter is shifted by δx. A shift parameter can be estimated by shifting a pair of records in opposite directions and forming a quotient R of the shifted records, i.e.

$$R_j(x_i) = \frac{g_{j-1}(x_i - \delta x)}{g_{j+1}(x_i + \delta x)}. \quad (20)$$

An entropy parameter H is then calculated as follows:

$$H_j(\delta x) = -\sum_{i=1}^{N} p_j(x_i) \log[p_j(x_i)], \quad (21)$$

wherein $$p_j(x_i) = \frac{R_j(x_i)}{\sum_{i=1}^{N} R_i(x_i)}. \quad (22)$$

Using the normalization of Eq. (22), $$\sum_{i=1}^{N} p_j(x_i) = 1. \quad (23)$$

By maximizing the entropy parameter H of Eq. (21), a shift parameter can be selected that most nearly shifts the numerator and denominator of Eq. (20) into registration to produce a maximally flat quotient. If the distribution p is perfectly flat, the associated entropy is simply log(N). A gradient search algorithm can be used to estimate the shift parameter.

Speckle pattern records generally are interpolated to determine shifted speckle patterns. This interpolation is conveniently performed using the Fourier shift theorem:

$$g_j(x_i - \delta x) = F^{-1}\{e^{-j2\pi\delta x f} G_j(f_k)\}, \quad (24)$$

wherein $$G_j(f_k) = F\{g_j(x_i)\}, \quad (25)$$

and F and $F^{-1}$ refer to Fourier transforms and inverse Fourier transforms, respectively. The ratio of Eq. (20) can be obtained as $$R_j(x_i) = \frac{F^{-1}\{e^{-j2\pi\delta x f_k} F\{g_{j-1}(x_i)\}\}}{F^{-1}\{e^{+j2\pi\delta x f_k} F\{g_{j+1}(x_i)\}\}}. \quad (26)$$

Such methods determine values of δx that make this ratio the "flattest." (Other methods such as those based on Eq. 4 can also be made more efficient using the Fourier shift theorem and a gradient search algorithm without assuming that speckle shifts are small.) As implemented, the innermost transforms are computed only once, so that at each iteration of a gradient search, only the following is computed:

$$R_j(x_i) = \frac{F^{-1}\{e^{-j2\pi\delta x f_k} G_{j-1}(f_k)\}}{F^{-1}\{e^{+j2\pi\delta x f_k} G_{j+1}(f_k)\}}. \quad (27)$$

Since the model of Eq. (19) is only approximate, there are occasional noisy spikes in the ratio calculated as in Eq. (20).

To avoid the possibility of the gradient search algorithm being trapped in a local maximum, a median filter is applied to the ratio prior to normalization and computation of entropy so that an entropy surface is convex. The gradient algorithm can also be modified to use any a priori knowledge of the amount of speckle record shift. For example, the gradient search can be restricted to a limited range of values. Alternatively, methods can be based on obtaining a minimum value of negative entropy.

Two Dimensional Methods

Figure 5A:
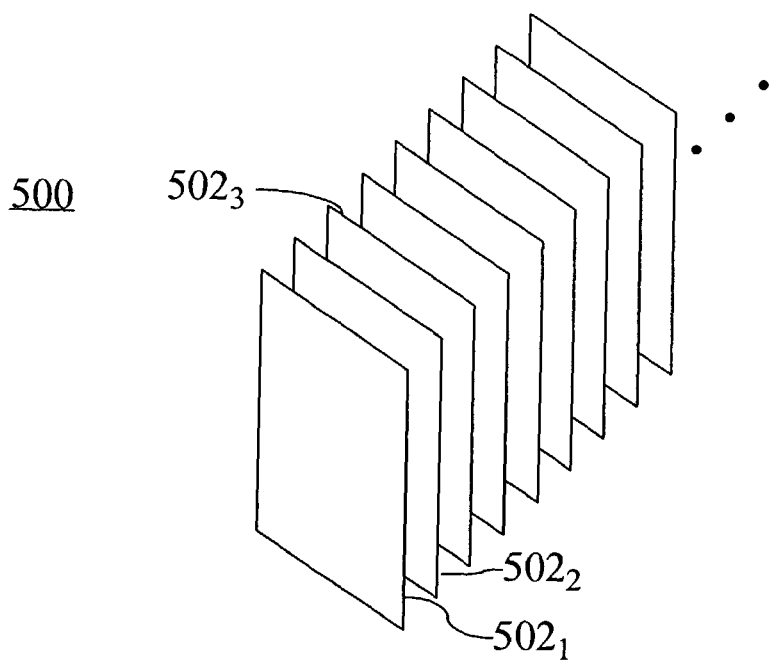
FIG. 5A illustrates a series of stacked speckle images.
Figure 5B:
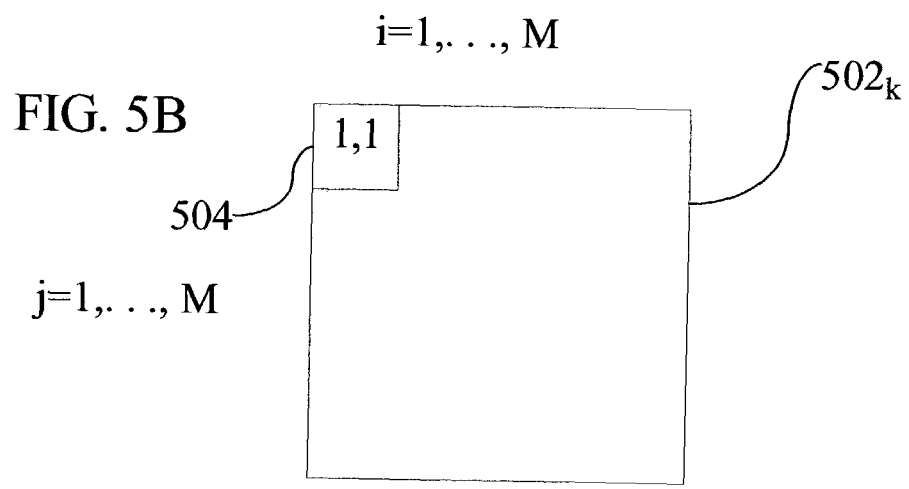
FIG. 5B illustrates a selected speckle image.
Figure 5C:
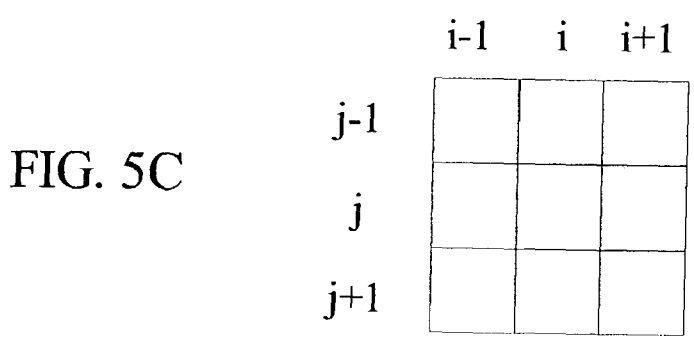
FIG. 5C illustrates a portion of the speckle image of FIG. 5B.

With reference to FIG. 5A, a speckle image series 500 of speckle images $502_1$, $502_2$, ..., is captured. Object motion can be assessed based on image-to-image changes in the speckle image series 500. For convenience in describing processing of the speckle image series 500, a representative speckle image $502_k$ is selected as illustrated in FIG. 5B. A time progression of lateral image shifts associated with this image can be estimated based on, for example, a pair of images adjacent to the $k^{th}$ image, i.e., the speckle images $502_k-1$, $502_{k+1}$. A mean square difference between portions of these images is defined as:

$$\varepsilon_k^2 = \sum_i \sum_j [g_{k+1}(x_i + \delta_x, y_j + \delta_y) - g_{k-1}(x_i - \delta_x, y_j - \delta_y)]^2, \quad (28)$$

wherein $(\delta_x, \delta_y)$ are x- and y-displacements, $g_k-1$, $g$, $g_{k+1}$ are pixel values associated with the speckle images $502_k-1$, $502_k$, $502_{k+1}$, respectively, and $x_i$, $y_j$, are pixel spatial coordinates. The summations are generally performed over, for example, a small subset of pixel values, typically pixel values associated with an array of about 3 pixels by 3 pixels as illustrated in FIG. 5C.

Displacements $(\delta_x, \delta_y)$ are estimated such that features in the selected speckle images are brought approximately into registration. Pixel values can be represented as follows using a two-dimensional Taylor series expansion:

$$g(x, y) = g(a, b) + \quad (29)$$

$$(x-a)\frac{\partial g}{\partial x}\bigg|_{\substack{x=a \\ y=b}} + (y-b)\frac{\partial g}{\partial y}\bigg|_{\substack{x=a \\ y=b}} + \frac{1}{2}\bigg\{(x-a)^2 \frac{\partial^2 g}{\partial x^2}\bigg|_{\substack{x=a \\ y=b}} + 2(x-a)(y-b)\frac{\partial^2 g}{\partial x \partial y}\bigg|_{\substack{x=a \\ y=b}} + (y-b)^2 \frac{\partial^2 g}{\partial y^2}\bigg|_{\substack{x=a \\ y=b}}\bigg\} + \ldots$$

Assuming that feature shifts are small, the approximations $$g_{k+1}(x_i + \delta_x, y_j + \delta_y) \approx g_{k+1}(x_i, y_j) + \delta_x \frac{\partial g_{k+1}}{\partial x} + \delta_y \frac{\partial g_{k+1}}{\partial y} \quad (30)$$

$$g_{k-1}(x_i + \delta_x, y_j + \delta_y) \approx g_{k-1}(x_i, y_j) - \delta_x \frac{\partial g_{k-1}}{\partial x} - \delta_y \frac{\partial g_{k-1}}{\partial y}$$

can be used, and the expression for the mean square error becomes:

$$\varepsilon_k^2 = \sum_i \sum_j \left\{ [g_{k+1}(x_i, y_j) - g_{k-1}(x_i, y_j)] + \delta_x \frac{\partial}{\partial x}[g_{k+1}(x_i, y_j) + g_{k-1}(x_i, y_j)] + \delta_y \frac{\partial}{\partial y}[g_{k+1}(x_i, y_j) + g_{k-1}(x_i, y_j)] \right\}^2. \quad (31)$$

For convenience, the following definitions are used:

$$T = [g_{k-1}(x_i, y_j) - g_{k+1}(x_i, y_j)] \quad (32a)$$

$$X = \frac{\partial}{\partial x}[g_{k+1}(x_i, y_j) + g_{k-1}(x_i, y_j)]$$

$$Y = \frac{\partial}{\partial y}[g_{k+1}(x_i, y_j) + g_{k-1}(x_i, y_j)].$$

Using these definitions, the equations $$\frac{\partial \varepsilon_k^2}{\partial \delta_x} = 0; \frac{\partial \varepsilon_k^2}{\partial \delta_y} = 0, \quad (32b)$$

produce a set of simultaneous equations:

$$\begin{vmatrix} \sum_i \sum_j X^2 & \sum_i \sum_j XY \\ \sum_i \sum_j XY & \sum_i \sum_j Y^2 \end{vmatrix} \begin{vmatrix} \delta_x \\ \delta_y \end{vmatrix} = \begin{vmatrix} \sum_i \sum_j TX \\ \sum_i \sum_j TY \end{vmatrix}. \quad (32c)$$

This set of equations can be inverted to obtain the displacement estimates ($\delta_x$, $\delta_y$):

$$\delta_x = \frac{1}{\Delta} det \begin{vmatrix} \sum_i \sum_j TX & \sum_i \sum_j XY \\ \sum_i \sum_j TY & \sum_i \sum_j Y^2 \end{vmatrix} \quad (32d)$$

$$\delta_y = \frac{1}{\Delta} det \begin{vmatrix} \sum_i \sum_j X^2 & \sum_i \sum_j TX \\ \sum_i \sum_j XY & \sum_i \sum_j TY \end{vmatrix}, \text{ wherein}$$

$$\Delta = det \begin{vmatrix} \sum_i \sum_j X^2 & \sum_i \sum_j XY \\ \sum_i \sum_j XY & \sum_i \sum_j Y^2 \end{vmatrix}. \quad (32e)$$

The arrays of Equations 32c–32e are N×M arrays and displacement estimates can be produced for every pixel or selected pixels.

Spatial gradients can be calculated based on, for example, a central difference formula so that $$\frac{\partial g_{k+1}(x_i, y_j)}{\partial x} = \frac{g_{k+1}(x_{i+1}, y_j) - g_{k+1}(x_{i-1}, y_j)}{2}. \quad (33)$$

The indicated summations, for each sub-element of the image pairs, can be calculated using convolution operations. For example, a (1, 1) element of the system matrix in Eq. 32c can be as:

$$\sum_i \sum_j X^2 = \left\{ (g_{k+1} + g_{k-1}) * \begin{bmatrix} \frac{1}{2} & 0 & -\frac{1}{2} \end{bmatrix} \right\}^2 * \begin{bmatrix} 1 & 1 & 1 \\ 1 & 1 & 1 \\ 1 & 1 & 1 \end{bmatrix}. \quad (34)$$

In this equation, the squaring operation is performed element-by element. The result of the convolution operations is a matrix that grows in height by three elements and width by six elements. The additional pixels can be discarded. Similarly, $$\sum_i \sum_j Y^2 = \left\{ (g_{k+1} + g_{k-1}) * \begin{bmatrix} \frac{1}{2} \\ 0 \\ -\frac{1}{2} \end{bmatrix} \right\}^2 * \begin{bmatrix} 1 & 1 & 1 \\ 1 & 1 & 1 \\ 1 & 1 & 1 \end{bmatrix}. \quad (35)$$

In Equations 34–35, the first convolution is with a derivative operator and the second convolution performs a local sum. In the example of Equations 34–35, derivatives are obtained based on a central difference estimate, but in additional examples, optimized derivative filters or other methods can be used. The operations of Equations 34–35 can extend matrix height and width by three rows and three columns, but these additional values can be discarded.

Methods and apparatus for quantitative imaging of elastic and viscoelastic properties of materials based on stacked speckle histories can provide surface maps of simple and complex plane strains. Two-dimensional maps of speckle shifts quantitatively describe, for example, an in-plane strain field in a test specimen. Regions with large or small strains can be imaged and mapped to identify, for example, inhomogeneities such as a subsurface defect or other substrate defect or potential defect.

As shown above, by producing a temperature change in a specimen, spatially resolved strain of the specimen can be obtained. Two-dimensional strain fields can be image and evaluated using apparatus such as shown in FIGS. 1,2, and 4, and specimens such as semiconductor wafers, circuit boards, integrated circuits, human tissues, metals, plastics, ceramics, or other materials can be selected. Strain resolutions of at least 1 µε (microstrain) can be obtained, and spatial resolutions can be selected based on imaging optics resolution. Strain mapping of objects and features as small as about 10 microns or objects having dimensions as large as a few meters can be performed, and strain images of still smaller and larger objects can be obtained. Variations in thermal response can be readily detected so that specimens or portions of specimens that selected thermal responses can be identified. Circuit substrates such as printed circuit boards, semiconductor wafers, mounted and unmounted integrated circuits, and electrical circuit elements including active elements, passive elements such as resistors, capacitors, inductors, transmission lines, waveguides, interconnects, vias, solder joints, wire bonds can be assessed. Thermally induced strain can be produced using a heating or cooling element, or an electrical drive can be applied so that a temperature change associated with operation of the circuit element is produced by, for example, Ohmic heating.

Examples are described above but can be changed in arrangement and detail without departing from the claimed subject matter. For example, illumination sources of different wavelengths can be used, and one, two, or more illumination sources can be provided in a single apparatus. Illumination can be provided to specimens at two equal and opposite angles or at two different angles. Speckle record acquisition rates can be increased or decreased and mechanical induced strains can be detected or quantified. Strains in specimens of sizes ranging from the size of integrated circuits and circuit features to large structures such as buildings and bridges can be investigated. We claim all that is encompassed by the appended claims.

The invention claimed is:

1. An apparatus for assessing strain, comprising:
   a light source configured to deliver a light flux to a specimen and produce a speckle pattern;
   a thermal source configured to produce a temperature change in at least a portion of the specimen;
   an image capture device configured to receive a series of speckle patterns produced by the light flux and associated with the temperature change produced by the thermal source; and
   a signal processor configured to receive the series of speckle patterns and determine a speckle shift based on an estimated shifted speckle pattern obtained from the series of speckle patterns received by the image capture device.

2. The apparatus of claim 1, further comprising a memory configured to store the series of received speckle patterns.

3. The apparatus of claim 1, further comprising a lens configured so that the speckle pattern received by the image capture device is an imaged speckle pattern.

4. The apparatus of claim 1, wherein the image capture device is configured to receive two-dimensional speckle patterns.

5. The apparatus of claim 4, wherein the signal processor is configured to determine speckle shifts associated with a plurality of specimen locations.

6. The apparatus of claim 1, wherein the specimen includes a circuit element, and the thermal source is configured to provide an electrical signal to the circuit element.

7. The apparatus of claim 1, wherein the signal processor is configured to determine the speckle shift based on a maximum entropy method.

8. The apparatus of claim 1, wherein the signal processor is configured to determine the speckle shift based on a minimum mean square method.

9. The apparatus of claim 1, wherein the signal processor is configured to associate the speckle shift with a specimen strain.

10. An apparatus, comprising:
    a thermal source configured to produced a temperature change in a specimen;
    at least one light source configured to alternately illuminate a specimen at a first angle of incidence and a second angle of incidence, and produce a first series of speckle patterns and a second series of speckle patterns, respectively, wherein the speckle patterns are associated with the temperature change;
    an image capture device configured to capture the first and second series of speckle patterns; and
    a signal processor configured to determine first and second speckle shifts based on estimated shifted speckle patterns obtained with the first and second series of recorded speckle patterns.

11. The apparatus of claim 10, wherein the first angle of incidence and the second angle of incidence are approximately equal and opposite.

12. An apparatus for assessing a substrate, comprising:
    a light source configured to illuminate the substrate and produce speckle patterns;
    an image capture device configured to record the speckle patterns;
    a thermal driver configured to produce a temperature change in at least a portion of the substrate; and
    a speckle record processor configured to detect strain at at least one substrate location based on a shift in the speckle patterns recorded by the image capture device, wherein the speckle record processor obtains the shift based on estimated shifted speckle patterns obtained by processing the recorded speckle patterns.

13. The apparatus of claim 12, further comprising an indicator configured to provide an assessment metric based on the speckle shift.

14. The apparatus of claim 13, wherein the thermal driver is configured to produce the temperature change by applying an electrical signal to the substrate.

15. The apparatus of claim 12, wherein the speckle record processor is configured to estimate speckle shifts associated with at least two regions of the substrate.

16. A strain measurement apparatus, comprising:
    a first laser diode configured to irradiate a specimen;
    a second laser diode configure to irradiate the specimen;
    a controller configured to alternately activate the first laser diode and the second laser diode;
    an image capture device configured to detect a first series of speckle patterns associated with irradiation of the specimen with the first laser diode and a second set of speckle patterns associated with irradiation with the second laser diode; and
    a signal processor configured to calculate a speckle pattern shift based the first set of speckle patterns and the second set of speckle patterns, wherein the signal processor is configured to produce estimated shifted speckle patterns from the first and second sets of speckle patterns, and to determine the speckle pattern shift based on the estimated shifted speckle patterns.

17. The apparatus of claim 16, wherein the first laser diode and the second laser diode are configured to irradiate the specimen at respective first and second angles of incidence selected to reduce contributions of specimen motion to the speckle pattern shift determined by the signal processor.

18. The apparatus of claim 17, where the image capture device is a linear diode array.

19. The apparatus of claim 17, where the image capture device is a CCD camera.

20. An apparatus for assessing strain, comprising:
    a light source configured to deliver a light flux to a specimen and produce a speckle pattern;
    a thermal source configured to produce a temperature change in at least a portion of the specimen;
    an image capture device configured to receive a series of two-dimensional speckle patterns produced by the light flux and associated with the temperature change produced by the thermal source; and a signal processor configured to receive the series of two-dimensional speckle patterns and determine a speckle shift associated with a plurality of specimen locations.

21. The apparatus of claim 20, further comprising a memory configured to store the series of received speckle patterns.

22. The apparatus of claim 20, further comprising a lens configured so that the speckle pattern received by the image capture device is an imaged speckle pattern.

23. The apparatus of claim 20, wherein the specimen includes a circuit element, and the thermal source is configured to provide an electrical signal to the circuit element.

24. The apparatus of claim 20, wherein the signal processor is configured to determine the speckle shift based on a maximum entropy method.

25. The apparatus of claim 20, wherein the signal processor is configured to determine the speckle shift based on a minimum mean square method.

26. The apparatus of claim 20, wherein the signal processor is configured to associate the speckle shift with a specimen strain.

27. An apparatus for assessing a substrate, comprising:
   a light source configured to illuminate the substrate and produce speckle patterns;
   an image capture device configured to record the speckle patterns;
   a thermal driver configured to produce a temperature change in at least a portion of the substrate; and
   a speckle record processor configured to detect strain at at least one substrate location based on a shift in the speckle patterns recorded by the image capture device, wherein the speckle record processor is configured to estimate speckle shifts associated with at least two regions of the substrate.

28. The apparatus of claim 27, further comprising an indicator configured to provide an assessment metric based on the speckle shift.

29. The apparatus of claim 28, wherein the thermal driver is configured to produce the temperature change by applying an electrical signal to the substrate.

30. An apparatus for strain detection, comprising:
   means for generating a speckle pattern associated with a surface of a test sample;
   means for thermally inducing a strain the sample;
   means for recording a speckle pattern history; and
   means for processing the speckle pattern history, wherein a test sample strains are detected at a plurality of test sample positions based on the processed speckle pattern history.

* * * * *

UNITED STATES PATENT AND TRADEMARK OFFICE
CERTIFICATE OF CORRECTION

| | |
|---|---|
| PATENT NO. | : 7,079,257 B1 |
| APPLICATION NO. | : 10/414707 |
| DATED | : July 18, 2006 |
| INVENTOR(S) | : Kirkpatrick et al. |

It is certified that error appears in the above-identified patent and that said Letters Patent is hereby corrected as shown below:

In the Specification:

Column 4, line 10, "connected a circuit" should read --connected a circuit--.

Column 4, line 67, "ca" should read --can--.

Column 6, line 4, "Eng" should read --Eng.--.

Column 7, line 54, "image is" should read --image is a--.

Column 11, line 36, "$j2\pi\delta xf$," should read --$j2\pi\delta xf_k$--.

Column 12, line 24, "$502_k$-1, $502_k$+1" should read --$502_{k-1}$, $502_{k+1}$--.

Column 12, line 33, "$g_k$-1, g, $g_k$+1" should read --$g_{k-1}$, g, $g_{k+1}$--.

Column 12, lines 34-35, "$502_k$-1, $502_k$, $502_{k+1}$" should read --$502_{k-1}$, $502_k$, $502_k$+1--.

Column 14, lines 19-20, "element-by element" should read --element-by-element--.

Column 14, line 64, "that selected" should read --so that selected--.

In the Claims:

Column 18, line 20, "strain the sample" should read --strain in the sample--.

UNITED STATES PATENT AND TRADEMARK OFFICE
CERTIFICATE OF CORRECTION

PATENT NO. : 7,079,257 B1
APPLICATION NO. : 10/414707
DATED : July 18, 2006
INVENTOR(S) : Kirkpatrick et al.

It is certified that error appears in the above-identified patent and that said Letters Patent is hereby corrected as shown below:

Column 18, line 23, "a test sample strains are" should read --test sample strains are--.

Signed and Sealed this

Sixth Day of March, 2007

JON W. DUDAS
*Director of the United States Patent and Trademark Office*